United States Patent Office 2,775,638
Patented Dec. 25, 1956

2,775,638

CATALYTIC POLYMERIZATION OF OLEFINS

Thomas H. Milliken, Jr., Moylan, George Alexander Mills, Swarthmore, and Alex G. Oblad, Springfield, Pa., assignors to Houdry Process Corporation, Wilmington, Del., a corporation of Delaware No Drawing. Application August 25, 1952,
Serial No. 306,282

3 Claims. (Cl. 260—683.15)

The present invention relates to catalytic hydrocarbon conversion processes and is particularly concerned with such processes including as the principal reaction involved in the formation of valuable hydrocarbons in the gasoline boiling range and of high anti-knock qualities, the polymerization and other concomitant reactions of olefinic unsaturates charged to the reaction zone or formed in such zone by other accompanying reactions taking place therein. More specifically in accordance with one aspect of the invention, saturated higher molecular weight branched chain hydrocarbons of high anti-knock quality are directly produced as a single step by the reaction of lower molecular weight olefins in the presence of hydrogen supplied to the reaction zone.

While the invention is more particularly concerned with polymerization, there is not precluded the possibility that a portion of the olefins may undergo other reactions under the conditions employed, including alkylation of any iso-paraffins; compounds thus formed within the gasoline boiling range are also desirable for inclusion in motor fuel.

Processes are known in which an unsaturated $C_4$-containing hydrocarbon fraction is polymerized in the presence of a solid type cracking catalyst at fairly low temperature (in the order of 200 to 300° F.) and at pressure such that the reactants are in liquid phase. Commercial processes have been employed in which the iso-octanes formed by dimerization over sulfuric or phosphoric acid catalyst are then hydrogenated in a separate reaction zone over nickel or similar catalysts at low temperature and at pressures up to about 4 atmospheres or alternatively at higher temperatures over sulfur-resistant hydrogenation catalysts.

In accordance with the present invention saturated higher molecular weight hydrocarbons in the gasoline boiling range are directly obtained from lower molecular weight unsaturated hydrocarbons by effecting reaction of a charge preferably rich in such olefins at superatmospheric hydrogen partial pressure and in the presence of a composited solid dual-function catalyst comprising a hydrogenation-dehydrogenation promoting component in intimate association with a carrier component having activity in promoting acid-catalyzed hydrocarbon conversion reactions. The intimate association of the active hydrogenation component at an acid site of the catalyst composite is of fundamental importance in furthering the promotion of both of the required types of reaction of the hydrocarbon molecule, and minimizing or avoiding undesirable side reactions particularly by the inherent effect of the hydrogenation component in keeping the acid site free from accumulation of products which enter into coke formation.

As hydrocarbon charge to the process there is preferably employed a fraction predominating or at least rich in olefins of 3 to 5 carbon atoms, particularly such a fraction containing n-butene and/or isobutene. The desired polymerization or other interaction of such olefins in the presence of acidic catalysts is favored at comparatively low to moderate temperatures (as up to about 400 to 600° F.), but with increasing pressures acceptable yields of desired products are obtained even at higher temperatures. While olefinic polymers constitute the initial products formed in the process, these may be partially transformed at the higher temperatures, particularly above 400° F., to isomeric compounds and to carbocyclic, including aromatic, compounds by cyclization of the olefins under the prevailing reaction conditions. For highest yields of desired polymeric conversion products the catalyst and reaction conditions are selected to balance the hydrogenation and polymerization in such manner that the olefins are polymerized and then hydrogenated.

Since polymerization or other olefin conversion is sought to be obtained, the logical starting materials for use in the process are lower molecular weight olefins. The invention is not to be construed as limited thereto, however, since $C_3$—$C_5$ saturated acyclic compounds, and particularly branch chain compounds of this type, may constitute all or at least part of the charge. Under appropriate conditions prevailing in the reaction zone, isobutane for instance, may be dehydrogenated to the corresponding olefin, immediately polymerized, at the active catalyst site and hydrogenated to form iso-octane; or to form other branched chain paraffins of 6 or more carbon atoms by interpolymerization with other olefins present or formed in the reaction zone and subsequent hydrogenation of such interpolymers. The starting material may also be composed of a mixture of acyclic hydrocarbons comparatively rich in olefins such as certain fractions obtained from other refinery operations, for example a so-called B—B fraction from non-catalytic cracking, comprising normal and iso-butylene in admixture with butane and isobutane, and which may contain minor quantities of other acyclic hydrocarbons within the same approximate boiling range. In this instance, under appropriate reaction conditions, a portion of the charge, among other concomitant reactions, is converted to triptane (2—2—3 trimethyl butane) largely as a result of polymerization and hydrogenation accompanied by splitting off of a methyl group.

The process is operative over a wide range of conditions but not with equal results. In general, temperatures short of usual cracking temperature, as in the range of 400 to about 850° F. are preferred, superatmospheric pressure of from about 10 to 50 atmospheres, and at least 1 mol of hydrogen being supplied to the reaction zone per mol of hydrocarbon charged. These conditions apply to the treatment of charge stocks predominating in olefinic unsaturates and in which there is no necessity of promoting preliminary reactions to supply the olefins in appreciable quantity. To effect preliminary dehydrogenation of a portion of any paraffins contained in the charge, higher reaction temperatures, of 700° up to 1150° F., and pressures of from 300 to 1500 pounds per square inch, are indicated.

Suitable catalysts of the dual-function type, that may be employed in the process, include those containing a major portion of a component having an acid function and therefore capable of promoting acid-catalyzed reactions such as polymerization (as well as isomerization and cracking) in intimate association with a minor amount of a hydrogenation-promoting component. By such intimate association the hydrogenation component is so located with respect to the acid function of the catalyst that the tendency to formation of coke in the hydrocarbon conversion process is inhibited. Typical catalysts include molybdenum oxides as the hydrogenation component incorporated in a carrier having fairly high cracking activity such as silica-alumina, which may be in the known forms of synthetic dried gel or acid-activated clay.

Other siliceous cracking type catalysts that may be employed as a support or carrier for the hydrogenating component include, dried gels of silica in association with a refractory metal oxide such as magnesia or zirconia, instead of or in addition to the alumina. Among other useful hydrogenating components there are included metals of group VIII of the periodic system, particularly nickel and the noble metals of the platinum family. Particularly in the case of catalysts comprising platinum type metals, the carrier need not be one having the comparatively high cracking activity of the siliceous materials hereinbefore listed, since alumina alone when suitably prepared or treated is sufficiently acidic to promote alkylation or other acid-catalyzed reactions. Among the suitable supports or carriers for these noble metal catalysts there may be named HF-treated alumina or alumina otherwise containing combined halogen, as well as gamma alumina or the familiar activated alumina of commerce which has been acid treated in that state prior to impregnation with a platinum salt or complex such as chloroplatinic acid.

In order to favor polymerization in competition with other possible concurrent reactions, charge stocks may be selected in which the ratio of olefins to paraffins capable of reacting therewith is comparatively high and particularly such fractions in which the mol content of olefins is approximately at least twice that of isoparaffins. Examples of typical $C_4$ fractions obtained from other refining operations are illustrated below:

TABLE 1

|  | Wt. Percent of total $C_4$'s | | | | |
| --- | --- | --- | --- | --- | --- |
|  | A | B | C | D | E |
| n-butene | 41.0 | 12.9 | 39 |  |  |
| i-butene | 20.0 | 19.3 | 23 | 32 | 40.6 |
| n-butane | 26.1 | 47.5 | 8 | 52 | 43.3 |
| i-butane | 10.5 | 19.3 | 30 | 16 | 16.1 |
| butadienes | 2.4 | 1.0 | 0.5 |  |  |

Of the above types of $C_4$ mixtures, compositions A and C with over 60% unsaturates are particularly desirable as a starting material in the process. Compositions such as E, although of lower olefin content but having high butenes/isobutane ratio, are also in the preferred class. Compositions such as B and D are less desirable particularly from the standpoint of low olefin content and comparatively low butylene/isobutane ratio, giving rise to alkylation and other competing side reactions in addition to polymerization of the olefins.

*Example I*

Commercial isobutylene, containing approximately 95% isobutylene and 5% normal butane are blended with hydrogen in an amount equivalent to 3 mols of hydrogen per mol $C_4$. The mixture is compressed to 500 pounds per square inch gauge and passed over a dual function catalyst made up of an active silica-alumina catalyst (87.5 $SiO_2$ and 12.5 $Al_2O_3$ weight percent) impregnated with 2% molybdenum oxides (as $MoO_3$) by weight of the base, operating at a temperature of 700° F. and at a space rate of 1.5 volumes of hydrocarbon per hour per volume of catalyst. Typical products yields, consisting of almost 100% of saturated products, are composed of about 75% hydrogenated dimer and trimer and 25% isobutane. The dimer can be separated from the trimer by distillation to obtain 100 octane additives for blending in motor and aviation fuels.

*Example II*

A mixture of 1 mol isobutane and 2 mols hydrogen is passed over a dual function catalyst containing 0.5% Pt on an acetic acid-treated activated alumina, at a pressure of 200 pounds per square inch, at a temperature of 1050° F., and at a space rate of approximately 2 volumes of isobutane per hour per volume of catalyst.

The catalyst employed is prepared by treating commercial activated alumina pellets for one hour periods with separate solutions of 10% acetic acid followed by washing, drying and calcination of the pellets in air at 900° F. The calcined pellets are then dipped for ½ hour in chloroplatinic acid, dried and calcined at 1050° F.

Typical product yields average about 22.5% based on the charge of isobutane and they are composed of a mixture of $C_8$ hydrocarbons including isooctane and xylene, the latter predominating.

*Example III*

A $C_4$ refinery fraction from thermal reforming of naphtha having approximately the composition of sample A in Table 1 above, together with 2 mols hydrogen is compressed to a reaction pressure of 275 pounds and contacted with a dual function catalyst composed of synthetic silica-alumina gel (90% $SiO_2$–10% $Al_2O_3$) containing 2% finely divided Ni deposited thereon. The reaction is carried out at 950° F. and at a space rate of 3 mols of hydrocarbon per hour per volume of catalyst. The conversion products include 35% of $C_7{}^+$ hydrocarbons, triptane constituting 2% of the $C_7$ hydrocarbons present.

While the invention has been particularly described with reference to the polymerization of lower molecular weight olefins, it will be understood that similar reactions can be carried out with other olefins such as those having up to about 6 or more carbon atoms, however, in these instances the possible extent of side reactions including cracking are less readily controlled.

Obviously, many modifications and variations of the invention as hereinbefore set forth may be made without departing from the spirit and scope thereof and therefore only such limitations should be imposed as are indicated in the appended claims.

What is claimed is:

1. The method of converting $C_3$—$C_5$ hydrocarbons to substantially olefin-free higher boiling hydrocarbons in a single catalytic conversion zone which consists in dehydrogenating the $C_3$—$C_5$ hydrocarbons, polymerizing the dehydrogenated $C_3$—$C_5$ hydrocarbons to higher boiling unsaturated hydrocarbons, and hydrogenating the unsaturated higher boiling hydrocarbons to form substantially olefin-free higher boiling hydrocarbons by passing a mixture consisting of a major volume proportion of hydrogen and a lesser volume of gaseous $C_3$—$C_5$ hydrocarbons at a pressure of at least 10 atmospheres at a space rate greater than 1 at a temperature within the range from 400° to 1150° F. over a catalyst consisting of a minor quantity of a group VIII metal as a hydrogenation-dehydrogenation promoting component deposited on an aluminaceous carrier having the property of promoting acid-catalyzed reactions.

2. The method of preparing substantially olefin-free hydrocarbons of the gasoline boiling range from mixtures of hydrocarbons boiling below the gasoline range which consists of: preparing a mixture containing at least one mol of hydrogen per mol of hydrocarbons, said hydrocarbons being predominantly $C_3$—$C_5$ hydrocarbons, subjecting said mixture to a dual-function catalyst comprising a dried silica-alumina gel as an acidic component and a group VIII metal hydrogenating component at a temperature within the range from 400° to 1150° F. at a pressure within the range from 10 to 100 atmospheres at a space rate greater than 1; and withdrawing the olefin-free hydrocarbons of the gasoline boiling range from the effluent from said dual function catalyst.

3. The method of preparing substantially olefin-free hydrocarbons of the gasoline boiling range which comprises passing a gaseous mixture consisting essentially of one mol of isobutane per two mols of hydrogen over a dual-function catalyst prepared by acid-leaching activated alumina particles and impregnating the acid-leached particles with chloroplatinic acid to provide 0.5% platinum in said catalyst, said passing of the gaseous mixture being at a space rate of 2 volumes of isobutane per hour per volume of catalyst at a pressure of 200 pounds per square inch at a temperature of 1050° F.

References Cited in the file of this patent

UNITED STATES PATENTS

| | | |
|---|---|---|
| 2,226,562 | Houdry | Dec. 31, 1940 |
| 2,227,639 | Frey et al. | Jan. 7, 1941 |
| 2,446,619 | Stewart et al. | Aug. 10, 1948 |
| 2,589,189 | Ciapetta | Mar. 11, 1952 |